(12) United States Patent
Chen et al.

(10) Patent No.: US 11,060,540 B2
(45) Date of Patent: Jul. 13, 2021

(54) MATERIAL GUIDING DEVICE

(71) Applicants: Yuan-Lai Chen, Taichung (TW); Da-Tan Liu, Taichung (TW)

(72) Inventors: Yuan-Lai Chen, Taichung (TW); Da-Tan Liu, Taichung (TW)

( * ) Notice: Subject to any disclaimer, the term of this patent is extended or adjusted under 35 U.S.C. 154(b) by 64 days.

(21) Appl. No.: 16/507,446

(22) Filed: Jul. 10, 2019

(65) Prior Publication Data

US 2021/0010496 A1 Jan. 14, 2021

(51) Int. Cl.
 *F15D 1/02* (2006.01)
 *F15D 1/04* (2006.01)

(52) U.S. Cl.
 CPC ..................... *F15D 1/04* (2013.01)

(58) Field of Classification Search
 CPC ........................................................ F15D 1/04
 USPC .............................. 138/39, 26, 146, 159, 178
 See application file for complete search history.

(56) References Cited

U.S. PATENT DOCUMENTS

| | | | | |
|---|---|---|---|---|
| 898,882 | A * | 9/1908 | Hawkins | F16L 57/06 |
| | | | | 285/16 |
| 1,680,480 | A * | 8/1928 | Shimer | F04B 53/1037 |
| | | | | 138/26 |
| 2,055,489 | A * | 9/1936 | Groeniger | E03D 11/18 |
| | | | | 285/180 |
| 3,105,520 | A * | 10/1963 | Lorett | F15D 1/04 |
| | | | | 138/39 |
| 3,113,593 | A * | 12/1963 | Vicard | F15D 1/04 |
| | | | | 138/39 |
| 4,159,073 | A * | 6/1979 | Liller | B04C 5/02 |
| | | | | 138/39 |
| 4,387,914 | A * | 6/1983 | Paulson | B65G 53/523 |
| | | | | 285/119 |
| 5,590,916 | A * | 1/1997 | Liu | F16L 43/00 |
| | | | | 285/179 |
| 7,174,919 | B2 * | 2/2007 | Kenyon | F01N 13/08 |
| | | | | 138/37 |
| 8,701,712 | B2 * | 4/2014 | Denney | F16L 55/05 |
| | | | | 138/30 |
| 2002/0121309 | A1* | 9/2002 | Davis | C04B 28/24 |
| | | | | 138/149 |
| 2005/0081937 | A1* | 4/2005 | Wilmeth | F16L 57/06 |
| | | | | 138/143 |
| 2015/0362181 | A1* | 12/2015 | Adam | F23M 11/042 |
| | | | | 110/265 |
| 2018/0310425 | A1* | 10/2018 | Liao | C23F 1/20 |

* cited by examiner

*Primary Examiner* — James F Hook
(74) *Attorney, Agent, or Firm* — Muncy, Geissler, Olds & Lowe, P C.

(57) ABSTRACT

A material guiding device is provided, including: a main body, including a first portion and a second portion which are coupled with each other, the first portion and the second portion defining a channel, the channel including an inlet portion and an outlet portion which commuted are with each other and a concave portion which is commuted between the inlet portion and the outlet portion, the inlet portion and the outlet portion extending respectively in a first extending direction and a second extending direction; in the first extending direction the concave portion being outwardly protrusive beyond the outlet portion, the concave portion being connected with the outlet portion and including a projection extending toward the first extending direction.

10 Claims, 6 Drawing Sheets

MATERIAL GUIDING DEVICE

BACKGROUND OF THE INVENTION

Field of the Invention

The present invention relates to a material guiding device.

Description of the Prior Art

Generally, when a large amount of material is transported, pneumatic means is used to transport the material to the target position through a tubular conveying passage. However, if the conventional conveying passage has a bent portion turning in a different direction, material accumulation often occurs and is retained in the bent portion of the pipeline. For transporting particle type materials, the material may even change its properties or qualities due to friction and collision of the pipe wall.

The present invention is, therefore, arisen to obviate or at least mitigate the above-mentioned disadvantages.

SUMMARY OF THE INVENTION

The main object of the present invention is to provide a material guiding device which provides smooth guiding effect.

To achieve the above and other objects, the present invention provides a material guiding device, including: a main body, including a first portion and a second portion which are coupled with each other, the first portion and the second portion defining a channel, the channel including an inlet portion and an outlet portion which commuted are with each other and a concave portion which is commuted between the inlet portion and the outlet portion, the inlet portion and the outlet portion extending respectively in a first extending direction and a second extending direction; in the first extending direction the concave portion being outwardly protrusive beyond the outlet portion, the concave portion being connected with the outlet portion and including a projection extending toward the first extending direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
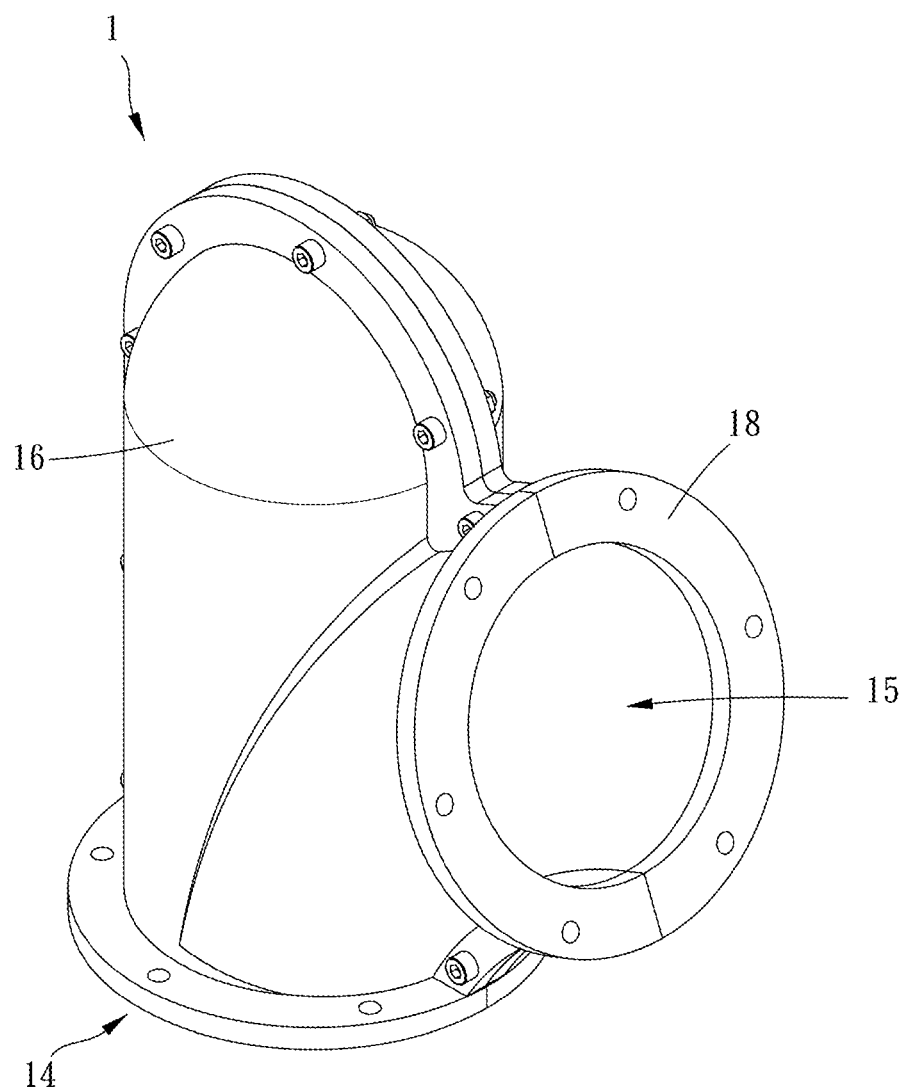
FIG. 1 is a stereogram of a preferable embodiment of the present invention.
Figure 2:
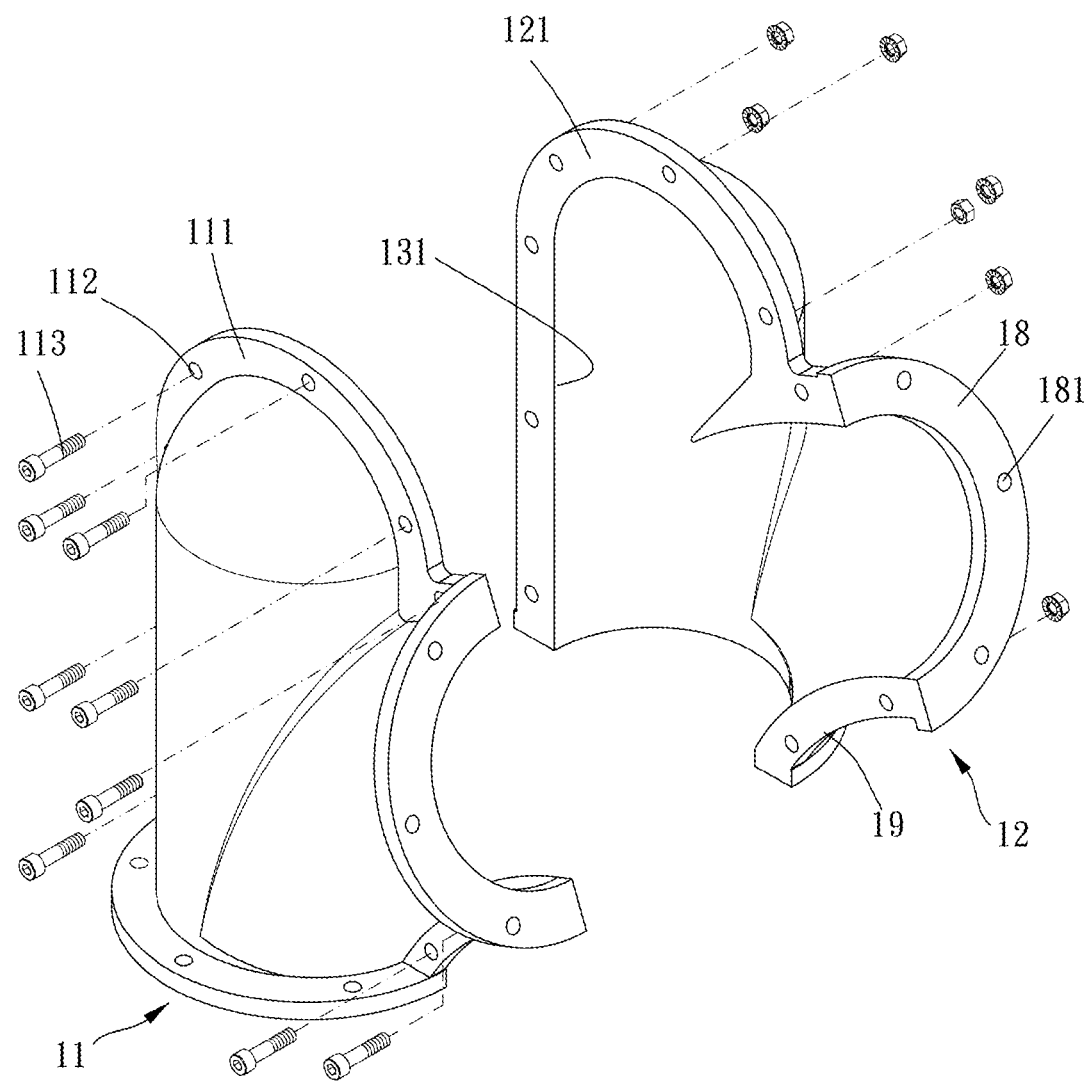
FIG. 2 is a breakdown drawing of a preferable embodiment of the present invention.
Figure 3:
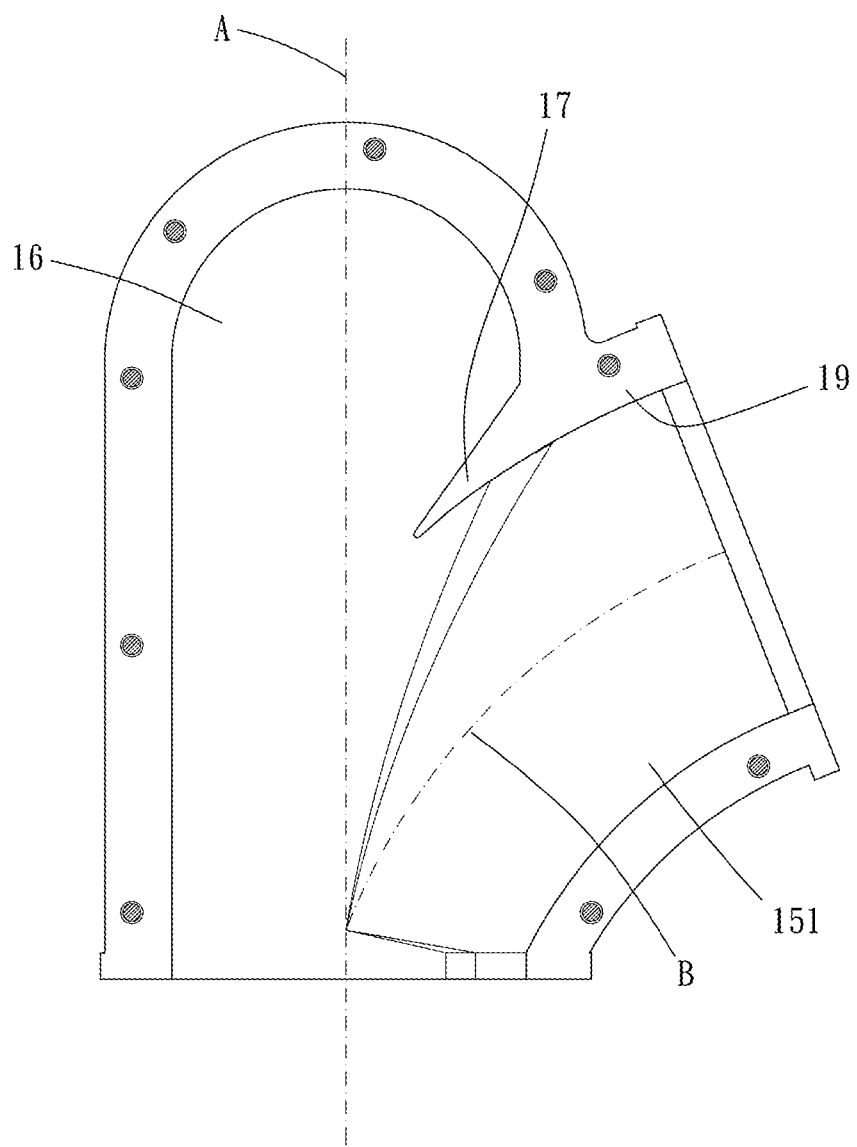
FIG. 3 is a cross-sectional view of a preferable embodiment of the present invention.
Figure 4:
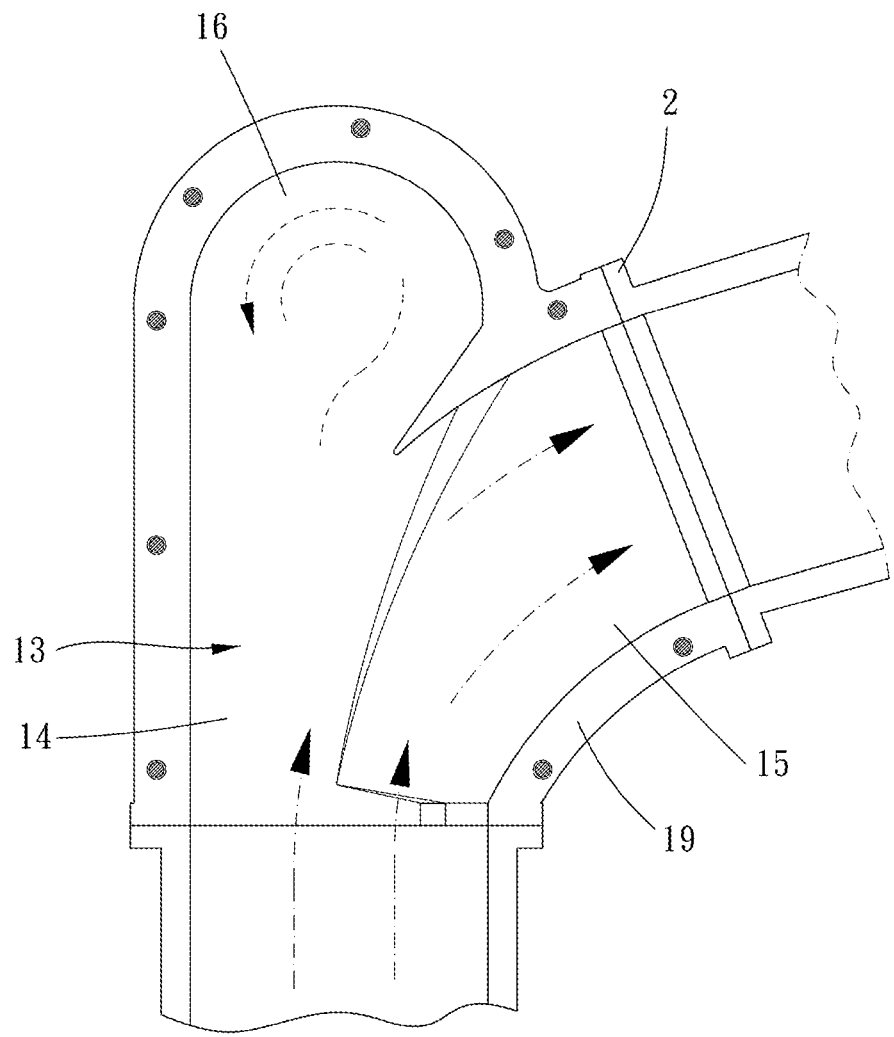
FIG. 4 is a cross-sectional view, in use, of a preferable embodiment of the present invention.

Please refer to FIGS. 1 to 4 for a preferable embodiment of the present invention. A material guiding device 1 of the present invention includes main body 1.

The main body 1 includes a first portion 11 and a second portion 12 which are coupled with each other, and the first portion 11 and the second portion 12 defines a channel 13. The channel 13 includes an inlet portion 14 and an outlet portion 15 which are commuted with each other and a concave portion 16 which is commuted between the inlet portion 14 and the outlet portion 15. The inlet portion 14 and the outlet portion 15 extend respectively in a first extending direction A and a second extending direction B extending. In the first extending direction A, the concave portion 16 is outwardly protrusive beyond the outlet portion 15. The concave portion 16 is connected with the outlet portion 15 and includes a projection 17 extending toward the first extending direction A. Whereby, the material guiding device can provide smooth guiding effect for material therein.

In a direction from the outlet portion 15 toward the inlet portion 14, an inner wall 131 of the channel 13 is tubularly curved along the projection 17. A caliber of the concave portion 16 is less than or equal to a caliber of the inlet portion 14 so that the material can move with air flow into the concave portion 16 and turns without direct impact to the inner wall 131. Preferably, the concave portion 16 is formed as a part of a sphere and entirely located between the outlet portion 15 and the first extending direction A, thus resistance against the inlet portion 14. A diametric dimension of the inlet portion 14 is larger than a diametric dimension of the concave portion 16 so that part of the material can be guided along the channel 13 to the gradually-expanding section 151 and is then discharged out, and part of the material comes into the concave portion 16 and follows the air flow to move to the outlet portion 15, thus preventing material accumulation, blocking or degradation of properties and qualities.

The outlet portion 15 and the projection 17 are connected and extend continuously and smoothly, and define a gradually-expanding section 151 extending toward the first extending direction. A caliber of the gradually-expanding section 151 is larger than a caliber of the concave portion 16, and the gradually-expanding section 151 and the inlet portion 14 partially overlap with each other so that part of the material can be directly discharged out and part of the material can be buffered in the concave portion 16 so as to stabilize the discharge flow of the material and is not easily stuck.

Specifically, each of the outlet portion 15 and the inlet portion 14 includes a coupling flange 18 at their respective peripheries, for connection to an opening 2, wherein each said coupling flange 18 includes a plurality of through holes 181 for fixation to the opening 2. The concave portion 16 is formed of part of the first portion 11 and part of the second portion 12 for easy manufacturing and processing. Each of the first portion 11 and the second portion 12 includes a connection portion 111, 121 projecting at their respective peripheries, and the connection portion 111 of the first portion 11 and the connection portion 121 of the second portion 12 are detachably connected. Each said connection portion 111, 121 includes a plurality of connection holes 112, and a plurality of fasteners 113 are disposed through the plurality of connection holes 112, thus tightly coupling the first portion 11 and the second portion 12. Preferably, two of said connection holes 112 of each said connection portion 111, 121 are respectively located at two opposite sides of the projection 17, which provides good tightness and avoids leakage. However, the first portion and the second portion may be coupled by riveting, screwing or the like. Preferably, a bridge portion 19 is connected between the inlet portion 14 and the outlet portion 15, a bridge portion 19 is connected between the concave portion 16 and the outlet portion 15, and each said bridge portion 19 is penetrated by at least one of the plurality of fasteners 113, thus having tight coupling. Preferably, each of the first portion 11 and the second portion 12 is integrally formed of one piece, thus preventing leakage.

Figure 5:
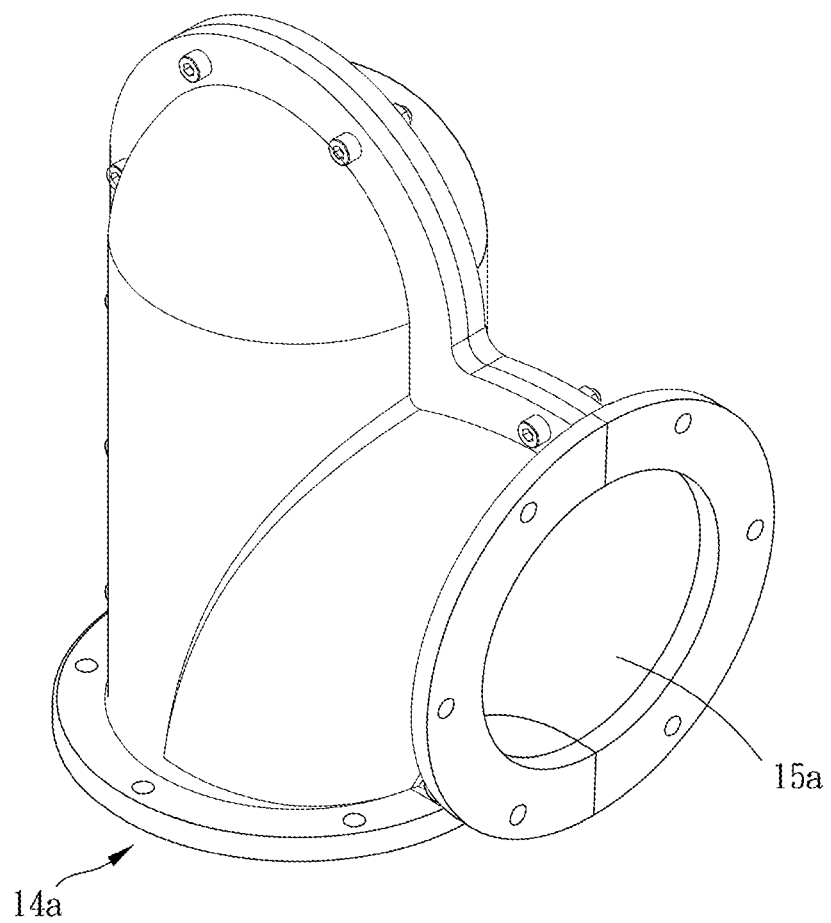
FIG. 5 is a stereogram of a second preferable embodiment of the present invention.
Figure 6:
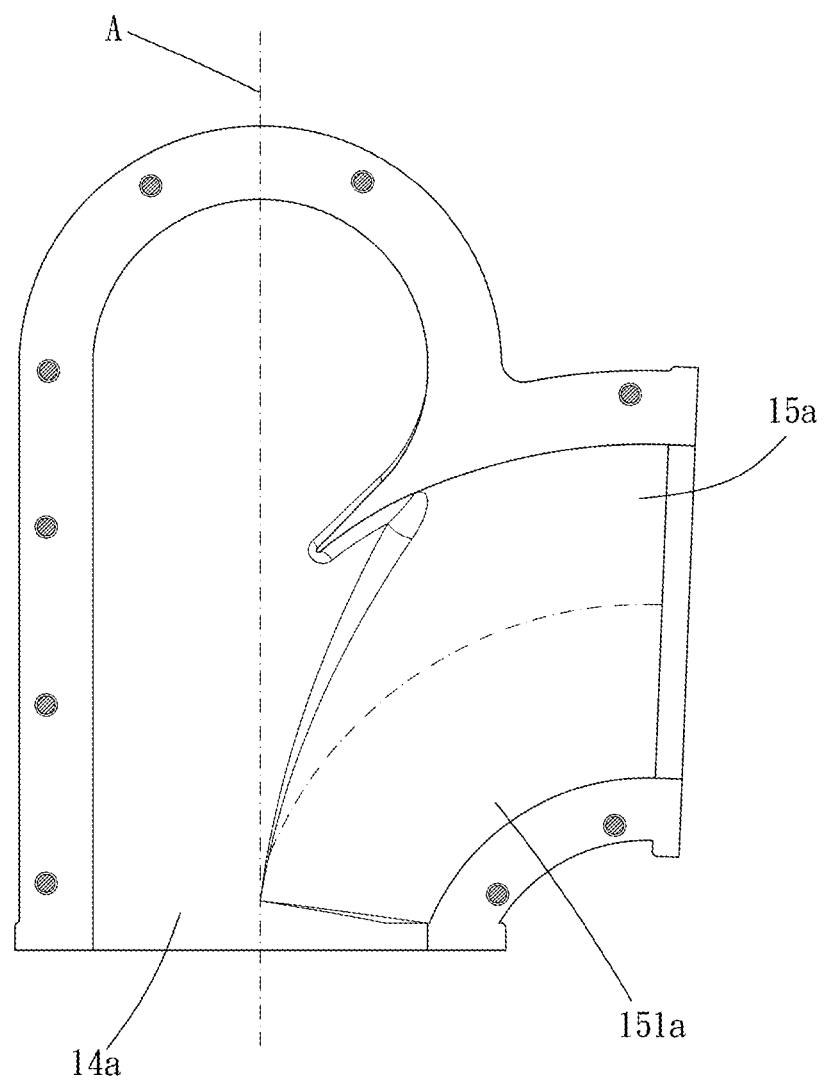
FIG. 6 is a cross-sectional view of the second preferable embodiment of the present invention.

As shown in FIGS. 5 and 6, in this embodiment, opening directions of the inlet portion 14a and the outlet portion 15a are perpendicular to each other, and the gradually-expanding section 151a is much more curved. However, the opening direction of the outlet portion and the curvature of the gradually-expanding section may be optional according to various requirements.

Preferably, the main body 1 is made of aluminum alloy, and the main body 1 includes a ceramic oxide layer formed by micro-arc oxidation treatment. The ceramic oxide layer may be partially or entirely formed on the inner wall 111 of the main body 1, thus being corrosion resistant and wear resistant. However, the ceramic oxide layer may be partially or entirely formed on the outer wall of the main body 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A material guiding device, including:
    a main body, including a first portion and a second portion which are coupled with each other, the first portion and the second portion defining a channel, the channel including an inlet portion and an outlet portion which are commuted with each other and a concave portion which is commuted between the inlet portion and the outlet portion, the inlet portion and the outlet portion extending respectively in a first extending direction and a second extending direction; in the first extending direction, the concave portion being outwardly protrusive beyond the outlet portion, the concave portion being connected with the outlet portion and including a projection extending toward the first extending direction;
    wherein the concave portion is formed as a part of a sphere and entirely located between the outlet portion and the first extending direction;
    wherein a diametric dimension of the inlet portion is larger than a diametric dimension of the concave portion;
    wherein each of the first portion and the second portion includes a connection portion projecting at their respective peripheries, and the connection portion of the first portion and the connection portion of the second portion are detachably connected;
    wherein each said connection portion includes a plurality of connection holes, and a plurality of fasteners are disposed through the plurality of connection holes of the connection portion of the first portion and the plurality of connection holes of the connection portion of the second portion;
    wherein the concave portion is formed of part of the first portion and part of the second portion; and two of said connection holes of each said connection portion are respectively located at two opposite sides of the projection.

2. The material guiding device of claim 1, wherein in a direction from the outlet portion toward the inlet portion, an inner wall of the channel is tubularly curved along the projection.

3. The material guiding device of claim 1, wherein a caliber of the concave portion is less than or equal to a caliber of the inlet portion.

4. The material guiding device of claim 1, wherein the outlet portion and the projection are connected and extend continuously and smoothly, and define a gradually-expanding section extending toward the first extending direction.

5. The material guiding device of claim 4, wherein a caliber of the gradually-expanding section is larger than a caliber of the concave portion.

6. The material guiding device of claim 1, wherein each of the outlet portion and the inlet portion includes a coupling flange projecting radially at their respective peripheries.

7. The material guiding device of claim 6, wherein each said coupling flange includes a plurality of through holes.

8. The material guiding device of claim 1, wherein in a direction from the outlet portion toward the inlet portion, an inner wall of the channel is tubularly curved along the projection; a caliber of the concave portion is less than or equal to a caliber of the inlet portion; the outlet portion and the projection are connected and extend continuously and smoothly, and define a gradually-expanding section toward the first extending direction extending; a caliber of the gradually-expanding section is larger than a caliber of the concave portion; the gradually-expanding section and the inlet portion partially overlap with each other; each of the outlet portion and the inlet portion includes a coupling flange projecting radially at their respective peripheries; each said coupling flange includes a plurality of through holes; a bridge portion is connected between the inlet portion and the outlet portion, a bridge portion is connected between the concave portion and the outlet portion, and each said bridge portion is penetrated by at least one of the plurality of fasteners; each of the first portion and the second portion is integrally formed of one piece.

9. The material guiding device of claim 1, wherein the main body is made of aluminum alloy.

10. The material guiding device of claim 9, wherein the main body includes a ceramic oxide layer formed by micro-arc oxidation treatment.

* * * * *